June 14, 1932. A. L. VARGHA 1,862,991
DISK CLUTCH
Filed March 14, 1929
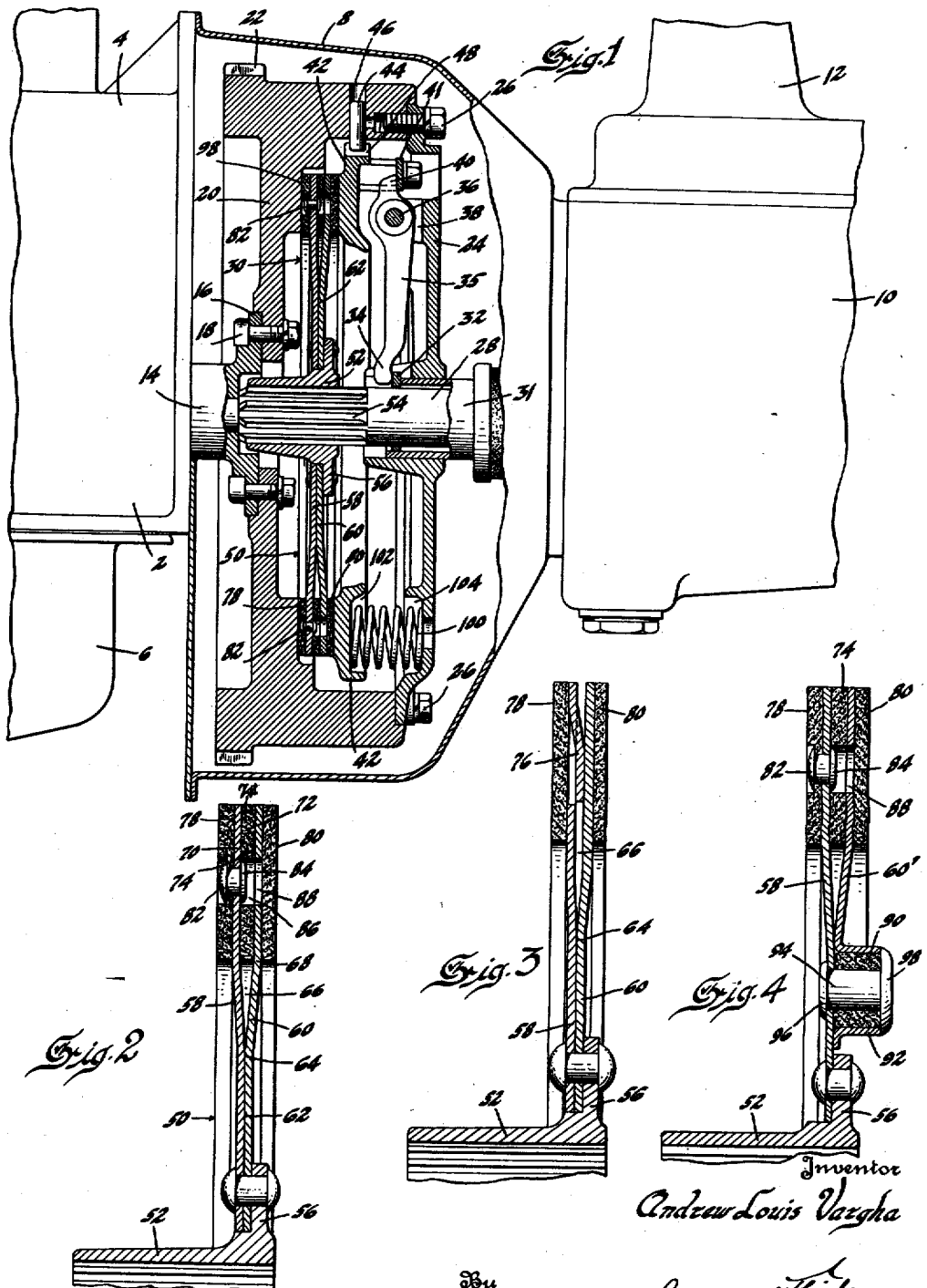
Inventor
Andrew Louis Vargha
By Blackmore, Spencer & Hulse
Attorneys Patented June 14, 1932

1,862,991

UNITED STATES PATENT OFFICE

ANDREW LOUIS VARGHA, OF DETROIT, MICHIGAN, ASSIGNOR TO GENERAL MOTORS CORPORATION, OF DETROIT, MICHIGAN, A CORPORATION OF DELAWARE

DISK CLUTCH

Application filed March 14, 1929. Serial No. 347,027.

This invention relates to clutches and has particular reference to a clutch used between the power plant and the transmission of an automotive vehicle, although the invention is adaptable for use in other relations.

The clutch is an improvement on the well known type in use on the Chevrolet automobile and the essential part of the invention resides in the improvement of the driven disk member of the clutch.

The clutch is constructed as a part of the fly wheel which is rigidly attached to the rear of the usual crank shaft. The fly wheel has an end closure plate forming therewith a housing through which there passes the rotatable shaft for transmitting power to the transmission. The shaft inside the housing is splined and has secured thereto a slidable member to which are fastened a plurality of disks forming one half of the clutch member. The disks are preferably secured at one side of an annular flange projecting from the member and are concentrically divergent for a portion of their extent. The ends of the plates are spaced in parallel planes and have interposed a suitable yielding member such as a thin sheet of rubber or cloth, or a wavy steel insert. The function of this yielding member is to hold the disks yieldingly spaced apart and to allow a relative approach to each other when the clutch is operated.

The outer portion of the disks have applied thereto the usual friction rings adapted to engage the faces of the clutch. The rivets which fasten the friction rings on the disks fit into mating openings in the yieldable member and in the second disk in order to prevent interference.

As a modification of this structure instead of the thin sheet of elastic material or wavy steel insert it is within the scope of the invention to press lugs or prongs from one disk so as to yieldingly press against the second disk.

As a third modification the two disks may be yieldingly held together by means of suitable rubber cylinders pressing against one disk and held in a housing on the second disk by means of the rivets which pass through the cylinders and are secured to both disks.

The clutch is provided with the usual ring and a plurality of springs positioned between the ring and end or closure plate to normally hold the clutch in engaged position. The customary shifter member is arranged about the shaft and operates a plurality of levers to press the ring away from the fly wheel to release the clutch.

Referring to the drawing:

Fig. 1 shows a view of a portion of an automobile sufficient to illustrate the invention, with the fly wheel housing broken away and the clutch and fly wheel shown in section.

Fig. 2 is an enlarged detailed view of one half of the improved clutch plate shown in Fig. 1.

Figs. 3 and 4 are views similar to Fig. 2 of modifications.

Referring to Fig. 1, the numeral 2 indicates the crank case of any suitable power plant 4 such as an internal combustion engine. 6 designates the oil pan, 8 the fly wheel housing, 10 the transmission and 12 the usual dome over the transmission to receive and hold the operating lever. Within the fly wheel housing there is shown the end of the crank shaft 14 having the flanged terminal 16 to which there is secured by means of the bolts 18 the usual fly wheel 20, provided with the toothed periphery 22 which permits the application of the starting motor. The fly wheel is hollow as shown and has the plate or cover 24 secured to the fly wheel by means of the machine bolts 26 to form a housing. Power transmitting shaft 28 connecting the clutch 30 with the transmission 10 is shown as passing centrally through the housing formed in the fly wheel.

A shiftable collar 31 is shown arranged about the power shaft 28 and is adapted to be operated in the usual way by the usual clutch pedal (not shown). The end 32 of the collar is adapted to operate on the end 34 of the levers 35 (only one of which is shown) pivoted as at 36 to ears 38 formed on the inside of the cover or closure 24. The opposite ends 40 of the levers 35 are adapted to operate on the bar 41 forming the base of a U-shaped structure secured to the usual shiftable ring 42 mounted to rotate with the fly wheel by means of the connection formed by the pins 44 passing through openings or slots 46 in the fly wheel and engaging grooves 48 in the shiftable ring 42.

The parts so far described are conventional and form no part of the invention except insofar as they relate to the combination.

The particular feature of the invention resides in the improvements made in the driven or clutch disk member indicated as a whole at 50. This clutch member has the central slidable collar 52 interiorly splined to engage the keys or splines 54 on the power transmitting shaft 28. Secured on the flange 56 of the collar 52 are the disks 58 and 60 which abut each other for a portion of their extent as shown at 62. Beyond the circle terminating substantially at the radius indicated at 64 the plates concentrically diverge as indicated at 66 to a circle the radius of which terminates substantially at 68. Beyond the circle 68 the end or peripheral portions 70 and 72 are parallel but spaced from each other.

Between the parallel portions 70 and 72 there is interposed the thin sheet of elastic or of yielding material 74 which may be of rubber or cloth or a wavy steel insert. The function of this yielding member 74 is to aid in keeping the plates spaced apart but essentially and primarily to at the same time permit of their limited approach to each other when the clutch is in operation to transmit power. The yielding material 74 may be secured to preferably but one of the disks as by riveting.

Instead of the yielding member 74 shown in Figs. 1 and 2 it is within the scope of the invention to press from one of the disks lugs or prongs 76 which are yieldingly held against the second disk by the spring tension in the prong. The prongs 76 act in precisely the same way as the yielding material 74.

On the outer sides of the disks 58 and 60 there are rigidly secured the friction materials 78 and 80 which are held on to the disks by means of a plurality of rivets 82, only one of which is shown. The heads of the rivets are countersunk in the friction material 78 and the inner ends are riveted over as shown at 84. The yielding material 74 as well as the second disk are provided with comformable or mating openings 86 and 88 which also conform to the riveted over end 84 of the rivet 82. The purpose of these openings is to prevent interference of the rivet end 84 with the second disk and thereby interfere with the efficient operation of the clutch as a whole.

Instead of both disks diverging as shown, either disk may be left in a single plane and the entire separation or the divergence placed in the second disk.

Referring to the species of Fig. 4, it will be seen that the disk 58, friction materials 78 and 80, yielding material 74, rivet 82, openings 86 and 88 as well as the flange 56 and slidable collar 52 are the same as those shown in the species of Figs. 1 and 2. The essential difference of the species of Fig. 4 resides in the use of the block or cylinder 90 composed of rubber. The disk 60' terminates short of the flange 56 and has pressed outwardly therefrom the housing portion 92 which receives the rubber cylinder 90. A rivet 94 passes through the opening of the cylinder and has the riveted over ends 96 and 98, the latter of which completely seats over the end of the rubber cylinder 90 to compress it somewhat and hold it tightly against the disk 58. While but one of these cylinders of rubber and inter-related structure is shown, a plurality of them (preferably three to six) are used and afford a means for resiliently holding the disk 60' on to the disk 58.

The numeral 98 in Fig. 1 indicates the second clutch face and the numeral 100 indicates one of a plurality of coil springs arranged in the recesses 102 and 104 of the ring 42 and the end plate or closure 24, the function of which springs is to tend at all times to press the ring against the friction material 80 and hold the two clutch members into engagement.

In order to throw the clutch out it is necessary to operate the usual foot or other pedal (not shown) which will force the collar 31 inwardly to push on the levers 35 which will withdraw the ring 42 and leave the fly wheel to rotate freely without effecting a turning of the driven clutch member 50 and power shaft 28.

When the clutch is engaged the springs 100 press the ring 42 tightly against the driven member 50, which brings about an engagement between the friction materials 78 and 80 and the face 98 and ring 42. The yielding material 74 between the plates may now yield or give to allow the plates or disks 70 and 72 to closer approach each other. The spring tension will cause the disks to again spread apart when the clutch pedal operates the ring 42.

As a result of the invention a cheap and easily manufactured clutch member is obtained. The metallic parts are made of stamped metal and the thickness of the disks shown in the figures is exaggerated for purposes of clearer illustration.

I claim:
1. In a clutch, a clutch member including a plurality of disks, a slidable member at the center of the disks, means for rigidly securing said disks to said slidable member, said disks concentrically diverging for a portion of their extent so as to space the peripheral portions of the disks in substantially parallel planes, yielding means interposed at the peripheries, friction means at the outer sides of said disks, and independent means passing through each disk to secure said friction means, said yielding means having openings conforming to or mating with said securing means to permit the compression of said resilient means.

2. In a clutch, a clutch member including a plurality of disks, a slidable member at the center of the disks, means for rigidly securing said disks to said slidable member, said disks concentrically diverging for a portion of their extent so as to space the peripheral portions of the disks in substantially parallel planes, yielding means interposed at the peripheries, and friction means at the outer sides of said disks, independent means passing through each disk to secure said friction means, said yielding means and the other disk each having openings conforming to or mating with the securing means to provide for noninterference and to permit the compression of said resilient means.

3. In a clutch, a clutch member including a plurality of disks, a slidable member concentrically arranged relative to said disks, means for operatively securing said disks to said slidable member, means for resiliently holding said disks together, said disks spaced at their outer portions, yieldable means interposed at said outer portions, and friction means secured to the outer sides of said disks.

4. In a clutch, a clutch member including a plurality of disks, a slidable member concentrically arranged relative to said disks, means for rigidly operatively securing said disks to said slidable member, means for resiliently mounting said disks relative to each each other including pieces of rubber, said disks spaced at their outer portions, yieldable means interposed at said outer portions, and friction means secured to the outer sides of said disks.

5. In a clutch, a clutch member including a plurality of disks, a slidable member concentrically arranged relative to said disks, means for rigidly operatively securing said disks to said slidable member, means comprising rubber blocks secured to one of said disks and housed in the second disk for resiliently holding said disks together, said disks spaced at their outer periphery, yielding means interposed at said outer periphery, and friction means secured to the outer sides of said disks.

6. In a clutch, a clutch member including a plurality of disks, a slidable member concentrically arranged relative to said disks, means for rigidly operatively securing said slidable member to said clutch member, means for resiliently mounting said disks relative to each other, said disks concentrically diverging for a portion of their extent, said disks spaced at their peripheries, yieldable means interposed at said peripheries, and friction means secured to the outer sides of said disks.

7. In a clutch, a clutch member including a plurality of disks, a slidable member arranged concentrically relative to said disks, means for rigidly operatively securing said slidable member to said clutch member, means for resiliently mounting said disks relative to each other, said disks concentrically diverging for a portion of their extent leaving spaced peripheral portions in substantially parallel planes, yielding means interposed at said peripheral portions, and friction means secured to the outer sides of said disks.

In testimony whereof I affix my signature.

ANDREW LOUIS VARGHA.